United States Patent Office 2,989,031
Patented June 20, 1961

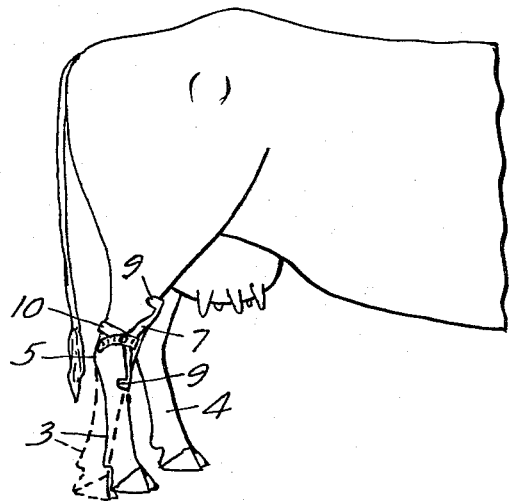
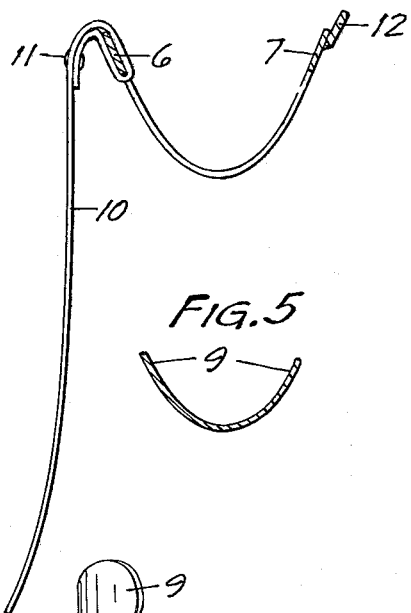
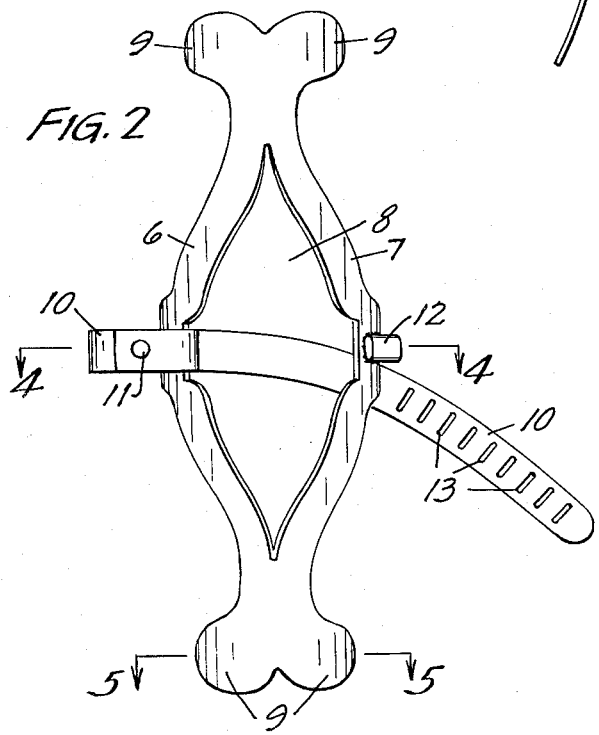
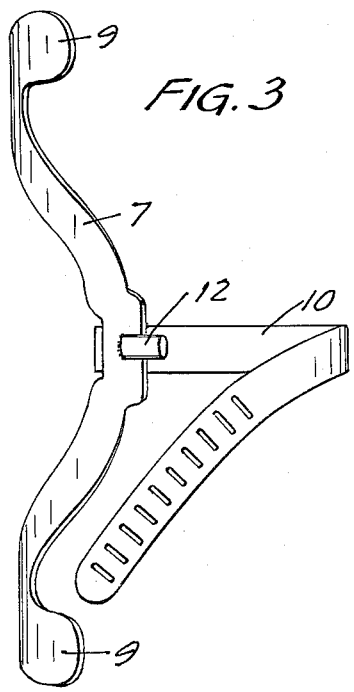

2,989,031
KICKING RESTRAINT
Arthur W. Slater, Eau Claire, Wis., assignor to Master-Kicker Corporation, Eau Claire, Wis., a corporation of Wisconsin
Filed June 10, 1958, Ser. No. 741,055
1 Claim. (Cl. 119—127)

This invention relates to cattle milking procedures, and provides an article which, when attached to the hind leg of a cow, will prevent that cow from kicking, either with the leg to which the device has been attached, or with its other hind leg.

It is, of course, well known that some cows, when being milked, are likely to attempt to kick while the milking operation is going on, or while the milking machine is being attached to the cow. Such tendency on the part of milk cows sets up a hazard which this invention successfully overcomes.

There have heretofore been various types of hobbles, and similar devices, intended to restrain a cow from kicking during milking operations, but such prior devices have either been wholly or partially unsuccessful in their intended purpose, or else have been difficult or dangerous to affix to the cow being milked. It is an object of the present invention to provide a very simple and inexpensive kicking restraint which may very quickly and easily be attached to the hind leg of a cow.

Another object of the invention is to provide a kicking restraint which will not permit the cow to put its full weight upon the leg to which the restraint has been attached; by reason of this feature the cow, when the restraint has been attached to one leg, is also precluded from kicking with the other leg, by reason of the fact that it is unable to stand upon the leg to which the restraint is applied.

It is a further object of the invention to provide a restraint which will be entirely safe to use; i.e., it will not damage or abrade the cow's leg, or other portions of its body adjacent thereto. In prior art devices with which I am acquainted the cow is prevented (at least in part) from kicking by restraining members which limited the movement of the leg, but which did not impede the cow's ability to try to move against the restraint imposed. This permitted the cow to struggle against the restraint which had been applied, thereby frequently resulting in chafing or other injury to the cow's body. In the device of the present invention, on the other hand, the device is applied in such manner as to bear on a principal tendon in the back of the cow's upper leg, thereby reducing the ability of the cow to struggle against the restraint and thereby cause injury to its body.

A further feature of the present device is that the same device may be applied to either hind leg of the cow, by inverting it. This permits the use of the same device on a cow which is to be milked from either the left or the right side.

Referring now to the drawings, in which the same reference character indicates corresponding parts:

FIGURE 1 is a view of my device, mounted in position upon the right hind leg of a cow.

FIGURE 2 is a front elevational view of one embodiment of my device.

FIGURE 3 is a side elevational view of the embodiment shown in FIGURE 2.

FIGURE 4 is a cross-sectional view along line 4—4 of FIGURE 2.

FIGURE 5 is a cross-sectional view along line 5—5 of FIGURE 2.

The dotted lines in FIGURE 1 of the drawings are intended to represent the position which the lower portion of the cow's leg will take when my kicking restraint is applied, as shown; that is, the lower portion of the cow's leg will then tend to move rearwardly, because of the pressure which is brought to bear, by strap 10, upon tendons extending along the back of the cow's leg.

Referring now to the drawings in greater detail, reference character 2 is a representation of a cow's body. Its hind legs are designated by reference characters 3 and 4. The anatomy of a cow is such that its "knee" joint 5 permits the cow to kick only forwardly with the lower part of its leg; that is, the cow's "knee" joint permits movement of the lower portion of its leg in a direction opposite from the lower part of a human being's leg. When a cow kicks, with its rear leg, it lifts its rear leg, bends it forwardly, and then kicks forwardly.

Referring now to the view of my restraint shown in FIGURE 2 of the drawings, that restraint is preferably made from a single piece of rigid material such as plastic or metal. As shown in FIGURES 4 and 5 particularly, the device is curved to fit about the front face of the cow's leg, with opposed sides 6 and 7 thereof lying against the outer and inner surfaces, respectively, of the leg. The central portion 8 of the device is excised, so that portions of the cow's leg may protrude therethrough. Each end portion of the restraint is formed with leaf-like projections 9 which extend inwardly along the sides of the leg, and thereby help to steady and center the device properly in place. It will be noted that the restraint is thinner at each of its ends than it is at its mid-portion. This renders the device more adaptable for use on cows of varying sizes, as it is thus not necessary to configure the end portions of the restraint to conform to a leg of particular size.

Strap member 10 is secured to the mid-portion of one side of the restraint by rivet 11, or by other attaching means. The opposed mid-portion of the device is formed with a preferably oblong fastening peg 12 which extends from the device, in the direction shown in the drawings. The free end of strap 10 is provided with a series of aligned apertures 13, through any one of which peg 12 may be inserted when the device is mounted upon the animal. Said apertures are preferably about one-half inch apart.

Peg 12 will remain securely within the aperture in which it has been placed, when the device is mounted, by reason of pulling pressure exerted upon strap 10. No supplementary means for holding the strap on the peg are needed.

I claim:

A kicking restraint comprising a rigid member and a strap member, said rigid member being substantially longer than it is wide and being curved about its lengthwise axis to conform to the hind leg of an animal, said rigid member being substantially wider through its mid-portion than it is through either of its end portions, said mid-portion having a central area, said central area being open to form opposed sides, said strap member being connected to said opposed sides, the curved end portions of said rigid member being more nearly flat than the curved mid-portion thereof.

References Cited in the file of this patent

UNITED STATES PATENTS

| | | |
|---|---|---|
| 664,838 | Dean | Jan. 1, 1901 |
| 1,509,574 | Wolfe | Sept. 23, 1924 |
| 1,624,861 | Dewey | Apr. 12, 1927 |